(12) United States Patent
Haynes et al.

(10) Patent No.: US 11,371,116 B2
(45) Date of Patent: Jun. 28, 2022

(54) LITHIUM EXTRACTION METHOD

(71) Applicant: NOVALITH TECHNOLOGIES PTY LIMITED, Sydney (AU)

(72) Inventors: Brian Haynes, New South Wales (AU); Jason Mann, New South Wales (AU)

(73) Assignee: Novalith Technologies Pty Limited, Sydney (AU)

(*) Notice: Subject to any disclaimer, the term of this patent is extended or adjusted under 35 U.S.C. 154(b) by 153 days.

(21) Appl. No.: 16/490,243

(22) PCT Filed: Feb. 28, 2018

(86) PCT No.: PCT/AU2018/050178
§ 371 (c)(1),
(2) Date: Aug. 30, 2019

(87) PCT Pub. No.: WO2018/157203
PCT Pub. Date: Sep. 7, 2018

(65) Prior Publication Data
US 2020/0071794 A1    Mar. 5, 2020

(30) Foreign Application Priority Data
Mar. 1, 2017   (AU) ................ 2017900694

(51) Int. Cl.
| | |
|---|---|
| *C22B 3/00* | (2006.01) |
| *C22B 3/06* | (2006.01) |
| *C22B 1/24* | (2006.01) |
| *C22B 26/12* | (2006.01) |

(52) U.S. Cl.
CPC ............. *C22B 3/06* (2013.01); *C22B 1/24* (2013.01); *C22B 26/12* (2013.01)

(58) Field of Classification Search
CPC .. C01D 15/08; C22B 1/00; C22B 3/06; C22B 3/12; C22B 3/16; C22B 26/12
See application file for complete search history.

(56) References Cited

U.S. PATENT DOCUMENTS

| | | | |
|---|---|---|---|
| 2,801,153 A | 7/1957 | Dwyer | |
| 4,124,684 A | 11/1978 | Olivier et al. | |
| 6,048,507 A | 4/2000 | Amouzegar et al. | |
| 9,028,789 B2 * | 5/2015 | Brito da Silva Correia | ................ C01D 15/08 |
| | | | 423/429 |
| 2006/0171869 A1 | 8/2006 | Anovitz et al. | |
| 2013/0302237 A1 | 11/2013 | Correia | |

OTHER PUBLICATIONS

Swain, "Recovery and recycling of lithium: A review", Separation and Purification Technology, vol. 372, pp. 388-403. 2017.
Australian Patent Office, "International Search Report" issued in connection to PCT/AU2018/050178, filed Feb. 28, 2018, 5 pages, dated May 22, 2018.
Australian Patent Office, "Written Opinion of the International Searching Authority" issued in connection to PCT/AU2018/050178, filed Feb. 28, 2018, 4 pages, dated May 22, 2018.

* cited by examiner

*Primary Examiner* — Steven J Bos
(74) *Attorney, Agent, or Firm* — McKee, Voorhees & Sease PLC

(57) ABSTRACT

According to the present invention there is provided a method for the extraction of lithium from one or more lithium-containing ores such as spodumene, the inventive method comprising the steps of: milling said ore/s to a predetermined average particle size; optionally calcining the milled ore; further optionally performing a secondary milling step; providing an aqueous suspension of the one or more lithium-containing ores at a predetermined solids concentration; subjecting the one or more lithium-containing ores to an aqueous extraction medium defined by a predetermined partial pressure of $CO_2$, a predetermined extraction temperature, over a predetermined time; and obtaining technical grade lithium carbonate/lithium bicarbonate therefrom. Optional concentration and/or precipitation/purification steps may follow.

14 Claims, 4 Drawing Sheets

LITHIUM EXTRACTION METHOD

CROSS REFERENCE TO RELATED APPLICATIONS

This is a U.S. National Phase application claiming priority to PCT/AU18/50178, filed Feb. 28, 2018, the entire contents of which are hereby expressly incorporated by reference in its entirety including, without limitation, the specification, claims, and abstract as well as any figures, tables, or drawings thereof.

FIELD OF THE INVENTION

The present invention relates to a method of extracting metal ions from a constituent ore. In particular, the invention describes a method of extracting lithium ions from lithium-containing ores such as spodumene using an aqueous extraction medium, under relatively moderate reaction conditions (e.g., pH range from about −1 to about 6). Under such conditions, it is found that the extracts comprise about 60% lithium on a mass basis.

Although the present invention will be described hereinafter with reference to its preferred embodiment, it will be appreciated by those skilled in the art that the spirit and scope of the invention may be embodied in many other forms.

BACKGROUND OF THE INVENTION

Any discussion of the prior art throughout the specification should in no way be considered as an admission that such prior art is widely known or forms part of common general knowledge in the field.

At an industrial level, lithium is assuming ever-increasing popularity given its many uses: ceramics, glasses, batteries, electronics, lubricating greases, metallurgy, pyrotechnics, air purification, optics, polymer chemistry, military applications and medicine—to name but a few. One of the principal uses of lithium is in batteries—and demand will only continue to grow as (amongst other emerging technologies) all-electric vehicles take to the roads over the next few years. Lithium is especially amenable to use in batteries owing to its high electrode potential (the highest of all metals); it is an important component of the electrolyte and of the anode in certain batteries. Because of its low atomic mass, it has a high charge-to-weight and power-to-weight ratio. Lithium batteries are preferred over other batteries due to their relatively high charge density (long life), but presently suffer from a relatively high cost per unit. Depending on the design and chemical compounds used, lithium cells can produce voltages from 1.5 V (comparable to a zinc-carbon or alkaline battery) to about 3.7 V.

However, it is not just the battery market that is driving ever-increasing demand for lithium; many of the other industries listed above are equally dynamic. In sum, the electrochemical properties of lithium give rise to very high energy and power densities for long useful life in small and comparatively lightweight packages.

According to the grading system referenced in FIG. 4, above, "Industrial Grade" lithium carbonate comprises <99% $Li_2CO_3$ on a molar basis; "Technical Grade" comprises 99% $Li_2CO_3$; "Battery Grade" comprises 99.5% $Li_2CO_3$ and accounts for about 75% of the global battery market, selling for about US$6500/tonne lithium carbonate; "EV Grade" comprises 99.9% $Li_2CO_3$ costs around US$8500/tonne lithium carbonate and accounts for 15% of the worldwide battery market; and finally, "EV-Plus Grade" lithium carbonate is 99.99% pure, sells for approximately US$15,000/tonne lithium carbonate and accounts for the remaining 10% of the market.

Along with ever-increasing global demand for lithium come challenges in how the mining industry may meet such demand; worldwide lithium production has increased about six-fold since 1980 (presently around 150,000 tonnes per year, as lithium carbonate, set against a 2008 US Geological Survey of 13 million tonnes in reserve)—and is growing annually at a rate of around 10%. However, lithium is not an element that lends itself to ease of extraction. Like all alkali metals, lithium metal is highly reactive and flammable. For instance, creating a lithium fire by exposing a small lithium shaving to air is a well-practised high school science demonstration. Because of its high reactivity, lithium never occurs freely in nature. Instead, it only appears in compounds, which are usually ionic. Lithium occurs in a number of pegmatitic minerals (requiring hard-rock mining and thermal activation prior to extraction), and due to its solubility as an ion, is also present in ocean water and can be obtained from brines and clays. Indeed, it is from rocks and salt waters that lithium is obtained on a commercial basis. Generally, lithium-hosted continental brines are regarded as being less expensive to exploit and therefore more commercially-viable than lithium minerals. However, almost all of the major brine lakes are in remote locations (e.g., in the Andes region bordering Argentina, Chile and Bolivia) and between them present unique technical and logistical challenges; the brine industry is thereby not without its limitations.

Extracting lithium from brine is a relatively simple process, which relies heavily on evaporation (i.e., concentrating the source brine, typically <0.1% Li). Evaporation is largely dictated by solar intensity and wind strength, as well as elevation/altitude. Rainfall obviously reverses, or at least slows the process. The brine is typically pumped from subsurface aquifers, through a circuit of evaporation ponds to iteratively increase its concentration. Such evaporative processes can be used to produce a commercially-saleable concentration of lithium carbonate from brine, but this can take several months—or even years. One complication is that brine is typically a mixture of many different salts, including magnesium salts. Because lithium and magnesium cations have similar ionic properties, they are difficult to separate from each other. As such, the technical grade lithium carbonate can be on-sold "as is" (i.e., incorporating magnesium contaminants), or subjected to subsequent purification steps, which serve to increase time and cost parameters.

Recent developments in brine extraction technology have been documented in, for instance, WO 2012/149163, which describes sieve systems useful for selectively extracting lithium from brines. The sieve system comprises a plurality of activated manganese and/or cobalt-containing spinel structures—and the associated process for recovering lithium from brine comprises the steps of passing the brine through a bed comprising a plurality of the activated spinels, such that the bed becomes at least partially loaded with lithium ions extracted from the brine; washing the bed with dilute acid to produce an effluent comprising at least some of the extracted lithium ions; and collecting the effluent comprising the extracted lithium ions.

However, the technology described in WO 2012/149163, as indeed that detailed in all other brine extraction methods suffers from the scarcity of salt lakes having a sufficient initial concentration of lithium to make the process viable.

The lower the source concentration of lithium, the more evaporation must be effected before such time as extracting the lithium can take place. For instance, a side-by-side comparison of seawater with a brine sample obtained from Salar de Uyuni (the world's largest salt flat, in Bolivia) suggested that in beginning with seawater, the overall extraction process was up to ten times more expensive. From source to saleable product can often take anywhere from 18 months to three years, depending upon evaporation rates.

Alkaline brine lakes also produce lithium chloride directly. Lithium chloride is converted to saleable lithium carbonate and lithium hydroxide by reaction with sodium carbonate and calcium hydroxide, respectively. As such, LiCl extraction shares many of the disadvantages outlined above, with the additional requirement to perform subsequent reactions in order to obtain commercially-saleable lithium carbonate.

Clearly then, unless lithium producers have large salt lakes at their doorstep, other sources of lithium are worth considering.

As mentioned above, lithium also occurs in a number of pegmatitic minerals. Spodumene is the most common commercially-exploited lithium mineral. It is a pyroxene mineral comprising lithium aluminium inosilicate, $LiAl(SiO_3)_2$. The normal low-temperature form, α-spodumene, crystallises in the monoclinic system whereas the high-temperature forms, γ- and β-spodumene crystallise in a hexagonal and tetragonal system, respectively; α-spodumene is thermally calcined to a mixture of γ- and β-spodumene at temperatures above 900° C. Spodumene has the nominal composition $LiAlSiO_6$; it contains up to 3.7% wt/wt Li.

Global production of lithium is around 36,000 metric tonnes (expressed as lithium metal) per annum, of which about 12,000 tonnes comes from the Greenbushes pegmatite of Western Australia. Other notable sources of lithium reside in China and Chile. The Talison mine in Greenbushes, Western Australia has an estimated reserve of 13 million tonnes of spodumene.

Currently, only high-grade pegmatites (such as that mined from Greenbushes) are competitive with brines as a source of lithium. In fact, Australian pegmatitic spodumene currently supplies about 33% of the world market for lithium, with most of the country's production being shipped as low-grade concentrates for purification and subsequent commercial application in China.

Methods of extracting lithium from spodumene can be classified according to two broad categories: acid leaching and carbonate leaching. Both require calcination of the spodumene (thermal conversion of the α-form to the β-form) as a prerequisite for the leaching step, as less than 1% of the lithium contained in α-spodumene is able to be extracted without prior transformation into β-spodumene due to the monoclinic crystal structure being largely impenetrable by the various extraction media.

As mentioned, technically, calcination occurs at around 900° C., although in practice, depending upon the precise ore used, the temperatures applied are typically of the order of 1000 to 1050° C., at which point β-spodumene is the predominant phase.

Acid leaching of lithium from β-spodumene is typically characterised by relatively harsh conditions. The main steps of this process route are generalised and depicted above, in FIG. 5. As shown in the below schematic, the first step is mixing the β-spodumene with concentrated sulfuric acid (96%). The mixture is heated to 250° C. in a sulfating kiln, where the lithium silicate reacts to form lithium sulfate which is soluble in water, according to the following reaction:

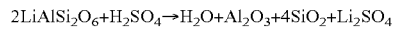

In technical processes, a yield of up to 97% of lithium sulfate during the first leaching step has been reported in literature. During sulfation and leaching various impurities such as iron, aluminium and magnesium also convert to their respective sulfate forms, which in turn make these elements accessible to leaching. Therefore, together with lithium, significant amounts of Fe, Mg, Mn, Na, and Al are also leached from spodumene. These elements are typically precipitated from the solution in order to avoid impurities in the final lithium carbonate product.

The hydrometallurgical steps following acid roasting and leaching are characterised as the solid-liquid separation of the leached rock; and the separation of impurities as hydroxides by adding soda ash ($Na_2CO_3$) and caustic soda (NaOH). After crystallisation with soda ash, a $Li_2CO_3$ product with a purity of about 98-99% is precipitated. The remaining impurities in the technical grade $Li_2CO_3$ after sulfuric acid leaching are Na, Al and Ca. Apart from the aluminium silicate residue, significant amounts of sodium sulfate are produced by the sulfuric acid route; for each ton of lithium carbonate more than two tons of $Na_2SO_4$ are produced.

Acid leaching of lithium carbonate from β-spodumene has formed the basis of many patent applications; the most widely quoted being U.S. Pat. No. 2,516,109, to Metalloy Corporation, which uses concentrated sulfuric acid to a produce a substantially dry mixture of ore and acid. Such a mixture requires a series of complex purification steps, as outlined above. It is notable in the art that even though the Metalloy patent has a filing date of 1948, it remains a preferred route for the production of commercial quantities of lithium carbonate some six decades later.

Alternatively, the so-called Quebec process uses basic sodium carbonate to pressure-leach lithium and carbonate from β-spodumene, as depicted in FIG. 6.

According to the Quebec process, a mineral concentrate is combined with water to produce a fine-grained slurry and reacted with soda ash at 215° C. and about 2140 kPa in a pressure vessel. In a second step, carbon dioxide is added, converting the insoluble lithium carbonate formed in the first step into the more soluble bicarbonate. At this stage contaminants such as Na, Al and Fe, are precipitated as cancrinite, feldspathoid or zeolite, depending on the conditions applied during the reaction. Because of the presence of sodium during the leaching reaction, by-products which may be of commercial value may be created during the leaching step, depending upon the leaching conditions employed.

The lithium carbonate is crystallised by driving off carbon dioxide which is then recycled in the process. The product formed via sodium carbonate leaching is generally around 99% purity, comparing favourably with that produced via the sulfate route discussed above. Potassium remains as the only relevant contaminant, in trace amounts only.

The technical grade lithium carbonate produced by the sulfate or Quebec processes can be purified by a number of refining steps. These include dissolution in HCl; the addition of $Ca(OH)_2$; and/or bicarbonatisation. The actual method of refining depends on the trace element composition remaining in the solution after leaching. Following the HCl route, purification similar to the natural evaporation processing of lithium brines may be carried out. The addition of $Ca(OH)_2$ produces lithium hydroxide according to the reaction:

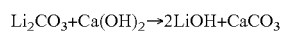

Finally, a bicarbonatisation step may be applied to lithium carbonate from the sulfate process as a second cleaning step complementary to an initial refinement via hydroxide precipitation.

Another well-known method of extracting lithium is described in U.S. Pat. No. 3,312,022, to Mini Richesses Nature. In this process, lithium-containing silicate is treated hydrothermally with an aqueous mixture of sodium carbonate and sodium hydroxide to produce an aqueous titre containing solid silicated lithium carbonate and sodium aluminosilicate. The mixture is then cooled and leached with aqueous ammonium carbonate to recover its lithium and sodium content in the form of a solution separated from a solid residue.

The scientific literature is also replete with new methods of producing lithium carbonate from spodumene. However, as mentioned above, the longevity of the sulfate route (see, Chart 2, above) is indicative of the fact that neither the patent nor the scientific literature has provided a substantial commercially-viable alternative in nearly six decades. For instance, Nogueira, et al., (*Proceedings of the International Conference on Mining, Material and Metallurgical Engineering*, Prague, Czech Republic, 11-12 Aug. 2014; Paper No. 72) describes two acid treatment routes for heat-treated lepidolite: an $H_2SO_4$ digestion method and an HCl leaching method. The $H_2SO_4$ digestion at 175° C. (followed by water leaching) allowed 88% Li recovery into the solution over 30 minutes. In comparison, the HCl leaching process carried out at 90° C. achieved similar yields but only after 4 hours of reaction. The $H_2SO_4$ digestion process was advantageous in respect of lithium selectivity over other metals; the Al, Mn and Fe concentrations in the resultant extracts were substantially higher using the HCl leaching method. Among its other teachings, the Nogueira document stresses the desirability of having good lithium selectivity in the extracted liquor.

Rosales, et al., (*Hydrometallurgy*, 2014, 147-148, pp. 1-6) outlines a process for the extraction of lithium from β-spodumene by leaching with hydrofluoric acid. Not only is HF a noxious substance that presents many hazards, the process proposed is also highly non-selective in fluorinating not only the lithium but also the silicates in the spodumene ore. The conditions quoted employ 19 equivalents of HF per mole of lithium, which is an extraordinarily wasteful use of an expensive and environmentally-harmful material such as HF.

Chen, et al., (*Hydrometallurgy*, 2011, 109, pp. 43-46) describes the preparation of lithium carbonate from spodumene by a sodium carbonate autoclave process. The results show that the conversion efficiency was not less than 94% under the optimal conditions. The purity of the obtained lithium carbonate can reach up to 99.6%, which is notably higher than that obtained by the sulfuric acid method or the Quebec process. With the use of sodium carbonate, purification of the extract is much simpler than if the extraction is performed with sulfuric acid. However, soda ash remains a costly reagent and this has restricted the uptake of the Chen process.

Whereas one of the principal limitations identified above in respect of brine extraction was the time taken per unit of lithium extracted (e.g., 18 months to three years depending upon the evaporation conditions), each of the methods referenced above, where lithium is extracted from spodumene, shares the general advantage that once an appropriate mill is built, the production of a unit of lithium carbonate from spodumene takes merely a matter of days. As such, spodumene extraction methods can more readily respond to market fluctuations in supply and demand; were brine the only viable lithium source and were there suddenly a spike in the global demand for lithium, the demand/supply/cost dynamic would be distorted markedly.

Another key advantage that mineral (e.g., spodumene) extraction has over its brine-based competition is the purity of the lithium carbonate it can produce. While all product used in the battery industry has to comprise at least 99.5% lithium carbonate, the makeup of the remaining 0.5% is important; higher amounts of iron, magnesium or other deleterious materials make for a less attractive technical grade product.

On the other hand, the use of strong, concentrated acids, soda ash and other reagents characterising the state of the art in relation to spodumene extraction can be expensive, inconvenient and environmentally-damaging. Further, the sequence of extraction steps before a commercially-saleable technical grade lithium carbonate is obtained can be somewhat labour-intensive.

It is an object of the present invention to overcome or ameliorate at least one of the disadvantages of the prior art, or to provide a useful alternative.

It is an object of a particularly preferred form of the present invention to provide for a relatively simple, convenient and effective means of extracting lithium from lithium-containing ores such as β-spodumene. Although the invention will be described with reference to specific examples it will be appreciated by those skilled in the art that the invention may be embodied in many other forms.

Definitions

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Throughout the description and claims, and for the avoidance of any doubt, the term "carbonic acid" is intended to mean a solution of carbon dioxide in water, in any proportion.

The person skilled in the art will readily appreciate that "spodumene ore" does not occur in nature as pure spodumene; it is laced with mineral impurities, many of which are also lithium-containing. Thus, other pegmatitic lithium-containing minerals may be recovered in association with spodumene, or separately. Such minerals include eucryptite, petalite, amblygonite, lepidolite, zinnwaldite, lithiophilite, and tryphilite. Other mineral forms containing lithium in significant quantities include hectorite and jadarite, with and without heat treatment. As such, reference throughout the ensuing description to "spodumene" inherently also includes some, if not all, of the minerals listed above (and others). Thus, the described method of extracting lithium from spodumene inherently also describes a method of extracting lithium from eucryptite, petalite, etc. Within the context of the present invention, spodumene is simply the most predominant lithium-containing mineral in the local areas (e.g., Greenbushes, Wash.) from which it is mined. It is emphasised that the above definition of spodumene would be thoroughly well understood by one of ordinary skill in the art.

One of skill in the art will appreciate that depending upon the calcination temperature and time, it is possible to obtain a calcine of up to 50% (w/w) γ and 50% (w/w) β; this is an ideal mixture for the inventive purposes. In industry though, it is commonplace to calcine at high temperatures and for long periods with the result that the γ transforms to a substantial degree in to β, see, e.g., Peltosaari, et al., *Minerals Engineering*, 82 (2015), pp. 54-60. Accordingly, reference to β-spodumene throughout the specification may technically reference both γ and β forms in varying proportions.

Finally, unless indicated otherwise, the term "purity" is referenced on a molar basis.

SUMMARY OF THE INVENTION

The inventive method gives rise to high purity lithium carbonate/bicarbonate in solution, under relatively mild extraction conditions (cf. the sulfate, Quebec and HF routes outlined above). Commercially, lithium is sold as a solid (usually as lithium carbonate, as noted above). Solid lithium carbonate is precipitated from a suitable concentration of the inventive solution via standard techniques.

According to a first aspect of the present invention there is provided the use of carbonic acid, or aqueous carbon dioxide in the extraction of lithium from one or more lithium-containing ores.

In a preferred embodiment, the one or more lithium-containing ores comprise β-spodumene. In another preferred embodiment, the one or more lithium-containing ores consist essentially of β-spodumene. In another preferred embodiment, the one or more lithium-containing ores are selected from the group consisting of spodumene, eucryptite, petalite, amblygonite, lepidolite, zinnwaldite, lithiophilite, and tryphilite, hectorite and jadarite.

The use of a weak or dilute acid such as carbonic acid to extract lithium from lithium-containing ores such as β-spodumene is wholly counterintuitive having regard to the existing state of the art. For instance, Giammar, et al., (*Chemical Geology*, 2005, 217, pp. 257-276) describes forsterite dissolution and magnesite precipitation at conditions relevant for deep saline aquifer storage and sequestration of carbon dioxide. The process described in this publication relates to the use of weak acids (e.g., carbonic acid) to extract magnesium from serpentinite ore. However, this in no way renders obvious the present invention. On the contrary, it is not obvious that similar conditions will work for lithium extraction from spodumene because: (a) weak acid conditions generally are known to attack serpentine, but as outlined above, only strongly acidic conditions are employed for spodumene; and (b) serpentine is a phyllosilicate, meaning that the silicate structure exists as hydroxylated layers that are held together by relatively weak hydrogen bonds. When phyllosilicates are calcined prior to extraction, the loss of water breaks the structure down almost completely. On the other hand, α-spodumene as mined is not hydrated and its calcination serves only to create internal voids without composition change through a conversion in the crystal structure from monoclinic α-spodumene to hexagonal and tetragonal γ- and β-spodumene, respectively. One of nominal skill in the art would not expect carbonic acid to extract lithium from this intact crystal. The differences in mechanism are highlighted by the fact that carbonic acid extraction of magnesium also liberates silica, whereas the inventive method provides comparatively little free silica following the extraction of lithium from spodumene. Moreover, according to the invention, such liberated silica is readily precipitated from solution during an additional purification step.

Korean patent application 101384803 does mention carbonic acid—although, notably, the carbonic acid is used to extract lithium from a solution comprising lithium ions. However, in no way does it address the issues raised by the above analysis of Giammar, et al.—i.e., why a weak acid should be able to extract lithium from the calcined mineral structure of β-spodumene.

According to a second aspect of the present invention there is provided a method for the extraction of lithium from one or more lithium-containing ores, said method comprising the steps of:
  a) milling said one or more lithium-containing ores to a predetermined average particle size to provide a milled crude ore;
  b) optionally calcining said milled crude ore at a predetermined calcining temperature;
  c) if step b) is performed, optionally performing a secondary milling step upon the calcined milled crude ore thus obtained;
  d) providing an aqueous suspension of the milled crude ore (calcined or non-calcined), at a predetermined solids concentration;
  e) subjecting said milled crude ore to an extraction medium defined by a predetermined partial pressure of $CO_2$, a predetermined extraction temperature, over a predetermined time; and
  f) obtaining technical grade lithium carbonate/lithium bicarbonate in solution therefrom.

In a preferred embodiment, the one or more lithium-containing ores comprise spodumene. In another preferred embodiment, the one or more lithium-containing ores consist essentially of β-spodumene. As such, the calcining step specified above in step b) becomes essential such that the α-spodumene is effectively calcined to β-spodumene; the reasons for this have been described above.

It is emphasised that the further optional secondary milling step defined in step b) is not essential to the method of the present invention. The optional step has been included because the prior art techniques of extracting lithium from lithium-containing minerals such as spodumene typically include an initial milling step followed by a calcination step, which is then often followed by a secondary milling step in which the β-spodumene obtained following calcining is milled to a relatively consistent average particle size. However, it will be appreciated that the same result can be achieved by omitting the optional secondary milling in step b) if the spodumene has already been milled to an appropriate and relatively consistent average particle size prior to the calcining defined in respect of step b).

The predetermined calcining temperature is preferably greater than about 900° C., thereby to convert at least some of any α-spodumene contained in the one or more lithium-containing ores to β-spodumene. It will be appreciated, in respect of spodumene ore, that the calcining step need not go to completion. For instance, between about 1% and about 100% of the crude α-spodumene may be converted to β-spodumene. This stated range is intended to encompass the stated endpoints and all % conversions therebetween. As such, the claimed range includes 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 81, 82, 83, 84, 85, 86, 87, 88, 89, 90, 91, 92, 93, 94, 95, 96, 97, 98, 99 and 100% conversion of crude α-spodumene to calcined β-spodumene, including intermediary values such as 70.5, 71.5, 72.5, 73.5, 74.5, 75.5, 76.5, 77.5, 78.5, 79.5 and 80.5% conversion. The preference for complete or substantially complete conversion has been rationalised above such that the tetragonal β-spodumene is found to be more amenable to the inventive extraction conditions than the monoclinic α-spodumene.

The predetermined partial pressure of carbon dioxide is between about 0.1 and about 300 bar. This defined range is intended to encompass the stated endpoints and all partial pressures therebetween. As such, the claimed range includes 0.1, 1, 5, 10, 15, 20, 25, 30, 35, 45, 50, 55, 60, 65, 70, 75, 80, 85, 90, 95, 100, 105, 110, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295 and 300 bar, including intermediary values such as 86, 87, 88, 89, 91, 92, 93, 94, 96, 97, 89, 99, 101, 102, 103, 104, 106, 107, 108 and 109 bar, etc.

In a preferred embodiment, the predetermined partial pressure of carbon dioxide is between about 0.1 and about 300 bar. In another preferred embodiment, the predetermined partial pressure of carbon dioxide is between about 1 and about 250 bar. In another preferred embodiment, the predetermined partial pressure of carbon dioxide is between about 5 and about 225 bar. In another preferred embodiment, the predetermined partial pressure of carbon dioxide is between about 10 and about 200 bar. In another preferred embodiment, the predetermined partial pressure of carbon dioxide is between about 25 and about 175 bar. In another preferred embodiment, the predetermined partial pressure of carbon dioxide is between about 50 and about 150 bar. In another preferred embodiment, the predetermined partial pressure of carbon dioxide is between about 75 and about 125 bar. In another preferred embodiment, the predetermined partial pressure of carbon dioxide is between about 80 and about 120 bar. In another preferred embodiment, the predetermined partial pressure of carbon dioxide is between about 85 and about 115 bar. In another preferred embodiment, the predetermined partial pressure of carbon dioxide is between about 90 and about 110 bar. In another preferred embodiment, the predetermined partial pressure of carbon dioxide is between about 95 and about 105 bar. In another preferred embodiment, the predetermined partial pressure of $CO_2$ is about 100 bar.

In a preferred embodiment, the predetermined partial pressure of carbon dioxide is between about 0.1 and about 300 bar. In another preferred embodiment, the predetermined partial pressure of carbon dioxide is between about 0.1 and about 250 bar. In another preferred embodiment, the predetermined partial pressure of carbon dioxide is between about 0.1 and about 225 bar. In another preferred embodiment, the predetermined partial pressure of carbon dioxide is between about 0.1 and about 200 bar. In another preferred embodiment, the predetermined partial pressure of carbon dioxide is between about 0.1 and about 175 bar. In another preferred embodiment, the predetermined partial pressure of carbon dioxide is between about 0.1 and about 150 bar. In another preferred embodiment, the predetermined partial pressure of carbon dioxide is between about 0.1 and about 125 bar. In another preferred embodiment, the predetermined partial pressure of carbon dioxide is between about 0.1 and about 120 bar. In another preferred embodiment, the predetermined partial pressure of carbon dioxide is between about 0.1 and about 115 bar. In another preferred embodiment, the predetermined partial pressure of carbon dioxide is between about 0.1 and about 110 bar. In another preferred embodiment, the predetermined partial pressure of carbon dioxide is between about 0.1 and about 105 bar.

In a preferred embodiment, the predetermined partial pressure of carbon dioxide is between about 0.1 and about 300 bar. In another preferred embodiment, the predetermined partial pressure of carbon dioxide is between about 1 and about 300 bar. In another preferred embodiment, the predetermined partial pressure of carbon dioxide is between about 5 and about 300 bar. In another preferred embodiment, the predetermined partial pressure of carbon dioxide is between about 10 and about 300 bar. In another preferred embodiment, the predetermined partial pressure of carbon dioxide is between about 25 and about 300 bar. In another preferred embodiment, the predetermined partial pressure of carbon dioxide is between about 50 and about 300 bar. In another preferred embodiment, the predetermined partial pressure of carbon dioxide is between about 75 and about 300 bar. In another preferred embodiment, the predetermined partial pressure of carbon dioxide is between about 80 and about 300 bar. In another preferred embodiment, the predetermined partial pressure of carbon dioxide is between about 85 and about 300 bar. In another preferred embodiment, the predetermined partial pressure of carbon dioxide is between about 90 and about 300 bar. In another preferred embodiment, the predetermined partial pressure of carbon dioxide is between about 95 and about 300 bar.

The predetermined extraction temperature is between about ambient (about 20° C.) and about 350° C. This defined range is intended to encompass the stated endpoints and all temperatures therebetween. As such, the claimed range includes extraction temperatures of 20, 25, 30, 35, 45, 50, 55, 60, 65, 70, 75, 80, 85, 90, 95, 100, 105, 110, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, and 350° C., including intermediary values such as 141, 142, 143, 144, 146, 147, 148, 149, 151, 152, 153, 154, 156, 157, 158 and 159° C., etc.

In a preferred embodiment, the predetermined extraction temperature is between about 20° C. and about 350° C. In another preferred embodiment, the predetermined extraction temperature is between about 40° C. and about 300° C. In another preferred embodiment, the predetermined extraction temperature is between about 60° C. and about 250° C. In another preferred embodiment, the predetermined extraction temperature is between about 80° C. and about 200° C. In another preferred embodiment, the predetermined extraction temperature is between about 100° C. and about 190° C. In another preferred embodiment, the predetermined extraction temperature is between about 120° C. and about 180° C. In another preferred embodiment, the predetermined extraction temperature is between about 130° C. and about 170° C. In another preferred embodiment, the predetermined extraction temperature is between about 140° C. and about 160° C. In another preferred embodiment, the predetermined extraction temperature is about 150° C.

In a preferred embodiment, the predetermined extraction temperature is between about 20° C. and about 350° C. In another preferred embodiment, the predetermined extraction temperature is between about 20° C. and about 300° C. In another preferred embodiment, the predetermined extraction temperature is between about 20° C. and about 250° C. In another preferred embodiment, the predetermined extraction temperature is between about 20° C. and about 200° C. In another preferred to embodiment, the predetermined extraction temperature is between about 20° C. and about 190° C. In another preferred embodiment, the predetermined extraction temperature is between about 20° C. and about 180° C. In another preferred embodiment, the predetermined extraction temperature is between about 20° C. and about 170° C.

In another preferred embodiment, the predetermined extraction temperature is between about 20° C. and about 160° C.

In a preferred embodiment, the predetermined extraction temperature is between about 20° C. and about 350° C. In another preferred embodiment, the predetermined extraction temperature is between about 40° C. and about 350° C. In another preferred embodiment, the predetermined extraction temperature is between about 60° C. and about 350° C. In another preferred embodiment, the predetermined extraction temperature is between about 80° C. and about 350° C. In another preferred embodiment, the predetermined extraction temperature is between about 100° C. and about 350° C. In another preferred embodiment, the predetermined extraction temperature is between about 120° C. and about 350° C. In another preferred embodiment, the predetermined extraction temperature is between about 130° C. and about 350° C. In another preferred embodiment, the predetermined extraction temperature is between about 140° C. and about 350° C.

The predetermined solids concentration equates to the weight/weight percentage of solids (i.e., milled β-spodumene) within the aqueous (i.e., water) solution. The predetermined solids concentration is between about 0.1% w/w and about 60% w/w. As such, the claimed range includes 0.1, 1, 2, 4, 6, 8, 10, 12, 14, 16, 18, 20, 22, 24, 26, 28, 30, 32, 34, 36, 38, 40, 42, 44, 46, 48, 50, 52, 54, 56, 58 and 60% w/w, including intermediary values such as 21, 23, 25, 27, 29, 31, 33, 35, 37 and 39% w/w.

In a preferred embodiment, the predetermined solids concentration is between about 0.1 and about 60% w/w. In another preferred embodiment, the predetermined solids concentration is between about 1 and about 55% w/w. In another preferred embodiment, the predetermined solids concentration is between about 5 and about 50% w/w. In another preferred embodiment, the predetermined solids concentration is between about 10 and about 40% w/w. In another preferred embodiment, the predetermined solids concentration is between about 20 and about 35% w/w. In another preferred embodiment, the predetermined solids concentration is about 30% w/w.

In a preferred embodiment, the predetermined solids concentration is between about 0.1 and about 60% w/w. In another preferred embodiment, the predetermined solids concentration is between about 0.1 and about 55% w/w. In another preferred embodiment, the predetermined solids concentration is between about 0.1 and about 50% w/w. In another preferred embodiment, the predetermined solids concentration is between about 0.1 and about 40% w/w. In another preferred embodiment, the predetermined solids concentration is between about 0.1 and about 35% w/w.

In a preferred embodiment, the predetermined solids concentration is between about 0.1 and about 60% w/w. In another preferred embodiment, the predetermined solids concentration is between about 1 and about 60% w/w. In another preferred embodiment, the predetermined solids concentration is between about 5 and about 60% w/w. In another preferred embodiment, the predetermined solids concentration is between about 10 and about 60% w/w. In another preferred embodiment, the predetermined solids concentration is between about 20 and about 60% w/w.

The predetermined average particle size of the milled one or more lithium-containing ores such as β-spodumene is between about 0.1 μm and about 1000 μm. This defined range is intended to encompass the stated endpoints and all average particle sizes therebetween. As such, the claimed range includes 0.1, 1, 20, 40, 60, 80, 100, 120, 140, 160, 180, 200, 220, 240, 260, 280, 300, 320, 340, 360, 380, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980 and 1000 μm, including intermediary values such as 61, 62, 63, 64, 65, 66, 67, 68, 69, 70, 71, 72, 73, 74, 75, 76, 77, 78, 79, 81, 82, 83, 84, 85, 86, 87, 88, 89, 90, 91, 92, 93, 94, 95, 96, 97, 98 and 99 μm.

In a preferred embodiment, the average particle size of the one or more lithium-containing ores or milled β-spodumene is between about 0.1 μm and about 1000 μm. In another preferred embodiment, the predetermined average particle size is between about 1 μm and about 800 μm. In another preferred embodiment, the predetermined average particle size is between about 5 μm and about 600 μm. In another preferred embodiment, the predetermined average particle size is between about 10 μm and about 600 μm. In another preferred embodiment, the predetermined average particle size is between about 20 μm and about 400 μm. In another preferred embodiment, the predetermined average particle size is between about 30 μm and about 200 μm. In another preferred embodiment, the predetermined average particle size is between about 40 μm and about 150 μm. In another preferred embodiment, the predetermined average particle size is between about 50 μm and about 100 μm. In another preferred embodiment, the predetermined average particle size is about 75 μm.

In a preferred embodiment, the average particle size of the one or more lithium-containing ores or milled β-spodumene is between about 0.1 μm and about 1000 μm. In another preferred embodiment, the predetermined average particle size is between about 0.1 μm and about 800 μm. In another preferred embodiment, the predetermined average particle size is between about 0.1 μm and about 600 μm. In another preferred embodiment, the predetermined average particle size is between about 0.1 μm and about 600 μm. In another preferred embodiment, the predetermined average particle size is between about 0.1 μm and about 400 μm. In another preferred embodiment, the predetermined average particle size is between about 0.1 μm and about 200 μm. In another preferred embodiment, the predetermined average particle size is between about 0.1 μm and about 150 μm. In another preferred embodiment, the predetermined average particle size is between about 0.1 μm and about 100 μm.

In a preferred embodiment, the average particle size of the one or more lithium-containing ores or milled β-spodumene is between about 0.1 μm and about 1000 μm. In another preferred embodiment, the predetermined average particle size is between about 1 μm and about 1000 μm. In another preferred embodiment, the predetermined average particle size is between about 5 μm and about 1000 μm. In another preferred embodiment, the predetermined average particle size is between about 10 μm and about 1000 μm. In another preferred embodiment, the predetermined average particle size is between about 20 μm and about 1000 μm. In another preferred embodiment, the predetermined average particle size is between about 30 μm and about 1000 μm. In another preferred embodiment, the predetermined average particle size is between about 40 μm and about 1000 μm. In another preferred embodiment, the predetermined average particle size is between about 50 μm and about 1000 μm.

The predetermined time, of course, depends upon the combination of the other parameters adopted (partial pressure of $CO_2$, temperature, pressure, average particle size of the one or more lithium-containing ores or β-spodumene). As such, the predetermined time will be the time in which the reaction goes to completion or substantial completion (~85% completion observed for the exemplary extraction provided below) for a given combination of the above four parameters. As such, the predetermined time is between about 1 and about 1000 minutes. This defined range is intended to encompass the stated endpoints and all time periods therebetween. As such, the claimed range includes 1, 5, 10, 15, 20, 25, 30, 35, 45, 50, 55, 60, 65, 70, 75, 80, 85, 90, 95, 100, 105, 110, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, 500, 505, 510, 515, 520, 525, 530, 535, 540, 545, 550, 555, 560, 565, 570, 575, 580, 585, 590, 595, 600, 605, 610, 620, 625, 630, 635, 640, 645, 650, 655, 660, 665, 670, 675, 680, 685, 690, 695, 700, 705, 710, 715, 720, 725, 730, 735, 740, 745, 750, 755, 760, 765, 770, 775, 780, 785, 790, 795, 800, 805, 810, 815, 820, 825, 830, 835, 840, 845, 850, 855, 860, 865, 870, 875, 880, 885, 890, 895, 900, 905, 910, 915, 920, 925, 930, 935, 940, 945, 950, 955, 960, 965, 970, 975, 980, 985, 990, 995 and 1000 minutes, including intermediary values such as 452, 454, 456, 458, 462, 464, 466, 468, 472, 474, 476, 478, 482, 484, 486, 488, 492, 494, 496, 498, 502, 504, 506, 508, 512, 514, 516, 518, 522, 524, 526, 528, 532, 534, 536, 538, 542, 544, 546 and 548 minutes.

In a preferred embodiment, said predetermined time is between about 1 and about 1000 minutes. In another preferred embodiment, said predetermined time is between about 100 and about 900 minutes. In another preferred embodiment, said predetermined time is between about 150 and about 800 minutes. In another preferred embodiment, said predetermined time is between about 175 and about 700 minutes. In another preferred embodiment, said predetermined time is between about 200 and about 600 minutes. In another preferred embodiment, said predetermined time is between about 220 and about 500 minutes. In another preferred embodiment, said predetermined time is between about 240 and about 450 minutes. In another preferred embodiment, said predetermined time is between about 260 and about 400 minutes. In another preferred embodiment, said predetermined time is between about 280 and about 350 minutes. In another preferred embodiment, said predetermined time is between about 290 and about 320 minutes. In another preferred embodiment, said predetermined time is about 300 minutes.

In a preferred embodiment, said predetermined time is between about 1 and about 1000 minutes. In another preferred embodiment, said predetermined time is between about 1 and about 950 minutes. In another preferred embodiment, said predetermined time is between about 1 and about 900 minutes. In another preferred embodiment, said predetermined time is between about 1 and about 850 minutes. In another preferred embodiment, said predetermined time is between about 1 and about 800 minutes. In another preferred embodiment, said predetermined time is between about 1 and about 750 minutes. In another preferred embodiment, said predetermined time is between about 1 and about 700 minutes. In another preferred embodiment, said predetermined time is between about 1 and about 650 minutes. In another preferred embodiment, said predetermined time is between about 1 and about 600 minutes. In another preferred embodiment, said predetermined time is between about 1 and about 550 minutes.

In a preferred embodiment, said predetermined time is between about 1 and about 1000 minutes. In another preferred embodiment, said predetermined time is between about 50 and about 1000 minutes. In another preferred embodiment, said predetermined time is between about 100 and about 1000 minutes. In another preferred embodiment, said predetermined time is between about 150 and about 1000 minutes. In another preferred embodiment, said predetermined time is between about 200 and about 1000 minutes. In another preferred embodiment, said predetermined time is between about 250 and about 1000 minutes. In another preferred embodiment, said predetermined time is between about 300 and about 1000 minutes. In another preferred embodiment, said predetermined time is between about 350 and about 1000 minutes. In another preferred embodiment, said predetermined time is between about 400 and about 1000 minutes. In another preferred embodiment, said predetermined time is between about 450 and about 1000 minutes.

In a preferred embodiment, the inventive method gives rise to a yield (on an extracted lithium to crude lithium basis) of between about 1% and about 99%. Preferably, the yield is between about 10% and about 95%. More preferably, the yield is between about 25% and about 90%. More preferably, the yield is between about 50% and about 85%. More preferably, the yield is about 75%.

This defined range of about 1 to about 99% is intended to encompass the stated endpoints and all yields therebetween. As such, the claimed range includes 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 81, 82, 83, 84, 85, 86, 87, 88, 89, 90, 91, 92, 93, 94, 95, 96, 97, 98 and 99% on an extracted lithium to crude lithium basis, including intermediary values such as 70.5, 71.5, 72.5, 73.5, 74.5, 75.5, 76.5, 77.5, 78.5, 79.5 and 80.5% on an extracted lithium to crude lithium basis.

In a preferred embodiment, the one or more impurities, aside from lithium, extracted from the one or more lithium-containing ores comprise calcium, iron, magnesium, potassium, sodium, aluminium, silicon and manganese. Preferably, the one or more impurities is present at a concentration of less than 0.5% of the lithium concentration on a molar basis. However, in some embodiments of the invention, silica, in an amount of up to about 12% of the total metals (molar basis) is extracted. Under such conditions, it is found that the inventive extraction media may also give rise to large-scale dissolution of the aluminosilicate matrix; an additional purification step is thereby optionally employed.

In a preferred embodiment, the inventive method further comprises a concentration step g), wherein the technical grade lithium carbonate obtained in solution from step f) is concentrated. Preferably, the concentration step comprises standard concentration techniques of the art, including but not limited to: the addition of a concentrator, evaporation, reverse osmosis and/or electrodialysis.

In a preferred embodiment, following the concentration step g), the lithium carbonate precipitates out of solution. If so, the inventive method optionally comprises a filtration step h), thereby to separate the precipitated lithium carbonate from the mother liquor.

It will be appreciated that the inventive method described above is adaptable and/or scalable to a continuous flow or batch-type scenario.

In an especially preferred form of the present invention, said $CO_2$ has a specific molar amount in water of about 3.7 mol/kg; said predetermined extraction temperature is about 150° C.; said predetermined pressure is about 100 bar; and said predetermined time is about 300 minutes (5 hours) the reaction was observed to go to around 85% completion (i.e., extraction completion, based on the measured amount of lithium in the β-spodumene)—and the observed impurities comprised K, Na, Ca, Mg, Mn, Fe, Al, and Si. In some embodiments, lithium constituted ~85% of the metals extracted from the sample, on a molar basis. In other embodiments, lithium constituted about 60% of the metals extracted from the sample, on a molar basis.

In an especially preferred form of the present invention, an additional purification step g) is performed, the purification step comprising precipitating out at least some of the silicate impurities from the technical grade lithium carbonate solution obtained in solution from step f).

According to a third aspect of the present invention there is provided lithium, when extracted from one or more lithium-containing ores by a method as defined according to the second aspect of the present invention.

In a preferred embodiment, the one or more lithium-containing ores comprise spodumene.

In a preferred embodiment, the lithium obtained from the method defined according to the second aspect of the invention is lithium carbonate/bicarbonate between about 95% and 99.9% purity (on a molar basis, as defined above). This defined range is intended to encompass the stated endpoints and all purities therebetween. As such, the claimed range includes 95, 95.1, 95.2, 95.3, 95.4, 95.5, 95.6, 95.7, 95.8, 95.9, 96, 96.1, 96.2, 96.3, 96.4, 96.5, 96.6, 96.7, 96.8, 96.9, 97, 97.1, 97.2, 97.3, 97.4, 97.5, 97.6, 97.7, 97.8, 97.9, 98, 98.1, 98.2, 98.3, 98.4, 98.5, 98.6, 98.7, 98.9, 98.9, 99, 99.1, 99.2, 99.3, 99.4, 99.5, 99.6, 99.7, 99.8 and 99.9% purity, including intermediary values such as 99.5, 99.15, 99.25, 99.35, 99.45, 99.55, 99.67, 99.75, 99.85 and 99.95%, etc.

In a preferred embodiment, said technical grade lithium carbonate/lithium bicarbonate is between about 96% and 99.8% purity on a molar basis. In another preferred embodiment, said technical grade lithium carbonate/lithium bicarbonate is between about 97% and 99.75% purity on a molar basis. In another preferred embodiment, said technical grade lithium carbonate/lithium bicarbonate is between about 98% and 99.7% purity on a molar basis. In another preferred embodiment, said technical grade lithium carbonate/lithium bicarbonate is between about 99% and 99.65% purity on a molar basis. In another preferred embodiment, said technical grade lithium carbonate/lithium bicarbonate is between about 99.3% and 99.6% purity on a molar basis. In another preferred embodiment, said technical grade lithium carbonate/lithium bicarbonate is about 99.5% purity on a molar basis.

In a preferred embodiment, said technical grade lithium carbonate/lithium bicarbonate is between about 96% and 99.8% purity on a molar basis. In another preferred embodiment, said technical grade lithium carbonate/lithium bicarbonate is between about 96% and 99.75% purity on a molar basis. In another preferred embodiment, said technical grade lithium carbonate/lithium bicarbonate is between about 96% and 99.7% purity on a molar basis. In another preferred embodiment, said technical grade lithium carbonate/lithium bicarbonate is between about 96% and 99.65% purity on a molar basis. In another preferred embodiment, said technical grade lithium carbonate/lithium bicarbonate is between about 96% and 99.6% purity on a molar basis.

In a preferred embodiment, said technical grade lithium carbonate/lithium bicarbonate is between about 96% and 99.8% purity on a molar basis. In another preferred embodiment, said technical grade lithium carbonate/lithium bicarbonate is between about 97% and 99.8% purity on a molar basis. In another preferred embodiment, said technical grade lithium carbonate/lithium bicarbonate is between about 98% and 99.8% purity on a molar basis. In another preferred embodiment, said technical grade lithium carbonate/lithium bicarbonate is between about 99% and 99.8% purity on a molar basis. In another preferred embodiment, said technical grade lithium carbonate/lithium bicarbonate is between about 99.3% and 99.8% purity on a molar basis.

In another preferred embodiment, said technical grade lithium carbonate/lithium bicarbonate is of a purity that if concentrated and precipitated in accordance with standard procedures in the art, may facilitate sale on an "as is" basis; that is, it can be on-sold for use in lithium batteries or other applications without needing to undergo subsequent refinement steps as described above in relation to the state of the art.

In another preferred embodiment, the extracted lithium carbonate further undergoes a concentration step; the concentration step can be any standard concentration techniques of the art, including but not limited to: the addition of a concentrator, evaporation, reverse osmosis, electrodialysis, liquid-liquid extraction, selective adsorption and solid state extraction and/or membrane separation. In another preferred embodiment, the purification may be effected by precipitation.

In another preferred embodiment, the inventive method is adaptable and/or scalable to a continuous flow or batch-type scenario.

In another preferred embodiment, the aqueous medium comprises water, one of more mineral acids, one or more organic acids, one or more alkaline salts, one or more ionic liquids, and combinations thereof.

In another preferred embodiment, the one of more mineral acids have a pH of about −1 to about 6. Preferably, the one of more mineral acids are optionally supplemented with a predetermined partial pressure of $CO_2$ between about 0.1 and about 300 bar; preferably between about 1 and about 250 bar; more preferably between about 5 and about 225 bar; more preferably between about 10 and about 200 bar; more preferably between about 25 and about 175 bar; more preferably between about 50 and about 150 bar; more preferably between about 75 and about 125 bar; more preferably between about 80 and about 120 bar; more preferably between about 85 and about 115 bar; more preferably between about 90 and about 110 bar; and most preferably between about 95 and about 105 bar.

In another preferred embodiment, the one or more organic acids are selected from the group consisting of acetic acid, citric acid, lactic acid, oxalic acid, and the like. Preferably, the one or more organic acids are present in concentrations ranging from dilute to concentrated.

In another preferred embodiment, the lithium salts extracted from the organic acid reaction medium are fired to form substantially pure lithium oxide or carbonate.

In another preferred embodiment, the one of more organic acids are optionally supplemented with a predetermined partial pressure of $CO_2$ between about 0.1 and about 300 bar; preferably between about 1 and about 250 bar; more preferably between about 5 and about 225 bar; more preferably between about 10 and about 200 bar; more preferably between about 25 and about 175 bar; more preferably between about 50 and about 150 bar; more preferably between about 75 and about 125 bar; more preferably between about 80 and about 120 bar; more preferably between about 85 and about 115 bar; more preferably between about 90 and about 110 bar; and most preferably between about 95 and about 105 bar.

In another preferred embodiment, the one or more alkaline salts comprise alkali hydroxides, carbonates, bicarbonates and combinations thereof. Preferably, the one or more alkaline salts comprise lithium hydroxide, lithium carbonate, lithium bicarbonate and combinations thereof.

In another preferred embodiment, the one of more alkaline salts are optionally supplemented with a predetermined partial pressure of $CO_2$ between about 0.1 and about 300 bar; preferably between about 1 and about 250 bar; more preferably between about 5 and about 225 bar; more preferably between about 10 and about 200 bar; more preferably between about 25 and about 175 bar; more preferably between about 50 and about 150 bar; more preferably between about 75 and about 125 bar; more preferably between about 80 and about 120 bar; more preferably between about 85 and about 115 bar; more preferably between about 90 and about 110 bar; and most preferably between about 95 and about 105 bar.

In another preferred embodiment, the one or more ionic liquids comprise protic and/or aprotic liquids. Preferably, the protic and/or aprotic liquids may be miscible or immiscible with water in the aqueous extraction medium.

In another preferred embodiment, the one of more ionic liquids are optionally supplemented with a predetermined partial pressure of $CO_2$ between about 0.1 and about 300 bar; preferably between about 1 and about 250 bar; more preferably between about 5 and about 225 bar; more preferably between about 10 and about 200 bar; more preferably between about 25 and about 175 bar; more preferably between about 50 and about 150 bar; more preferably between about 75 and about 125 bar; more preferably between about 80 and about 120 bar; more preferably between about 85 and about 115 bar; more preferably between about 90 and about 110 bar; and most preferably between about 95 and about 105 bar.

In another preferred embodiment, the lithium is obtained as lithium carbonate/bicarbonate, at a purity of about 85% on a molar basis. In another embodiment, the impurities comprise silicon in an amount of about 12%, sodium in an amount of about 1.5% and potassium in an amount of about 1% on a molar basis.

According to a fourth aspect of the present invention there is provided an apparatus for facilitating the extraction of lithium from one or more lithium-containing ores, said apparatus comprising:
  means for providing an aqueous suspension of said one or more lithium-containing ores, at a predetermined solids concentration;
  means for subjecting said one or more lithium-containing ores to an extraction medium defined by a predetermined partial pressure of $CO_2$, a predetermined extraction temperature, over a predetermined time; and
  means for obtaining technical grade lithium carbonate/lithium bicarbonate therefrom.

In a preferred embodiment, the inventive apparatus further comprises means for effecting an initial milling step, whereby the one or more lithium-containing ores are milled to a predetermined average particle size to provide a milled crude ore prior to being provided as the aqueous suspension.

In a preferred embodiment, the inventive apparatus further comprises means for effecting a calcining step following said milling step. Preferably, the means for effecting the calcining step comprise a heating unit adapted to heat the milled crude ore to a calcining temperature above about 900° C.

In a preferred embodiment, the inventive apparatus further comprises means for effecting a secondary milling step upon the calcined milled crude ore.

In a preferred embodiment, the inventive apparatus further comprises means for concentrating the technical grade lithium carbonate obtained in solution following exposure to the extraction medium.

In a preferred embodiment, the inventive apparatus further comprises filtration means, for filtering off any precipitated lithium carbonate following exposure to the concentration means.

In preferred embodiments of the fourth aspect, the predetermined partial pressure of $CO_2$, the predetermined extraction temperature, the predetermined solids concentration and the predetermined time are as defined above in respect of the second aspect of the present invention.

In an especially preferred embodiment of the invention, the apparatus as defined in the fourth aspect of the invention is used to effect the method defined in the second aspect of the invention.

BRIEF DESCRIPTION OF THE FIGURES

A preferred embodiment of the invention will now be described, by way of example only, with reference to the accompanying drawings in which.

EXAMPLES

Overview

Figure 1:
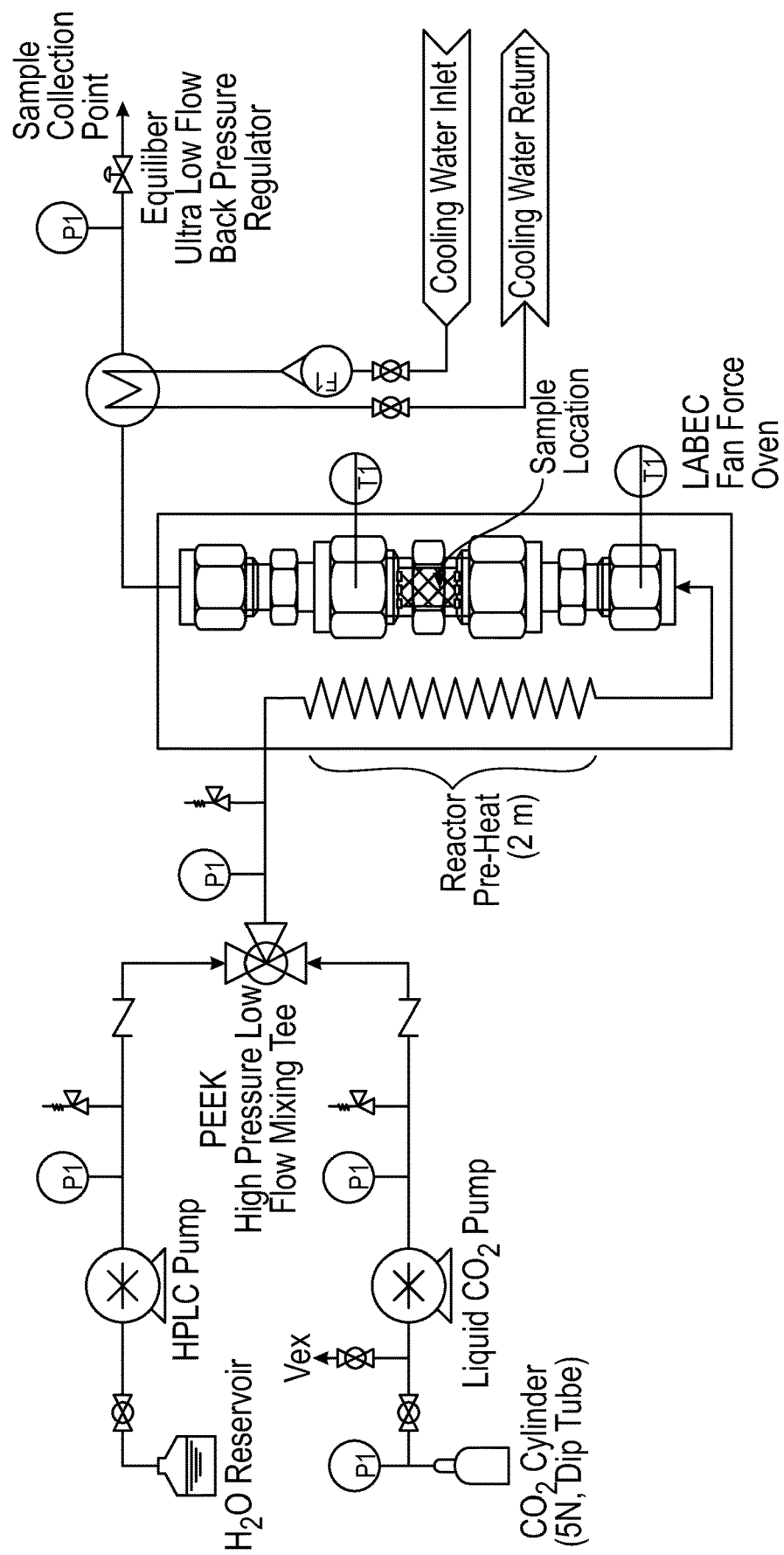
FIG. 1 is a schematic of a micro-fluidised bed reactor, from which the data provided in the inventive examples have been obtained.

The present inventors have conducted experiments in a small batch reactor in which a water-$CO_2$ mixture is passed through a pulverised sample of β-spodumene. In the reactor, shown schematically in FIG. 1, the conditions are such that the mixture forms two phases, gas (essentially $CO_2$) and liquid (water saturated with $CO_2$). Some of the $CO_2$ absorbed by the water phase is in the form of carbonic acid and it is the proton concentration associated with that acid that is responsible for the extraction of Li from the mineral sample.

When lithium is extracted into the aqueous phase, the concentration of protons is suppressed and further extraction of lithium becomes slower. This effect increases as the concentration of Li increases, with the result that it becomes impractical to allow the lithium concentration to become very high; experiments undertaken to date suggest that the maximum practical concentrations that can be achieved are of the order of 100 ppm (wt/wt; or ~0.015 mol/L) which is very low compared with the concentration of lithium carbonate that would be needed to bring about precipitation of lithium carbonate under the reaction conditions (~0.7 mol/L, ~5000 ppm) at 150° C. and 100 bar. Therefore, additional processing steps are needed before lithium carbonate could be produced.

Figure 2:
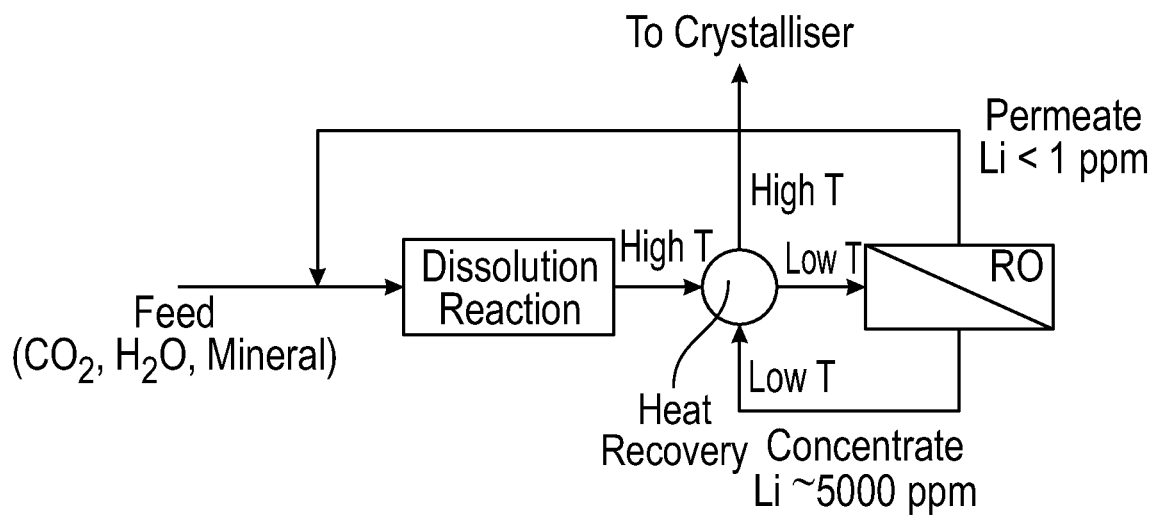
FIG. 2 is a schematic of the integrated dissolution and RO for the production of $Li_2CO_3$ from a dilute Li stream produced by carbonic acid.

The inventors have demonstrated that reverse osmosis (RO) is suitable for concentrating dilute Li (~50 ppm, dosed as $LiNO_3$) up to the concentration required to precipitate lithium carbonate at process conditions. As the process is already at pressure, the use of RO is well suited to this process. RO also has the benefit in that it produces a purified permeate stream which can be recycled through the $CO_2$ extraction process, as shown in FIG. 2. The recycle of the leachate water minimises the water consumption in the process while also facilitating the maintenance of dilute extraction conditions.

Extraction of lithium in carbonic acid also extracts some of the sodium and potassium that are invariably present in the mineral; in addition, some silica and aluminium are extracted. Typically, the molar ratios of the extracted elements are:

Li:Si:Na+K:Al=1:0.20:0.02:<0.01

Silica and alumina can be removed relatively easily by flocculation and precipitation as $SiO_2$ and $Al_2O_3$ or other means. However the relative molar concentration of Na+K needs to be reduced by a factor of ~200 to a value <0.0001 in order to achieve the purity of lithium (99.99% lithium carbonate) needed for the highest-value applications. Without wishing to be bound by theory, the inventors believe that a combination of low-cost membrane techniques can achieve the desired outcome of a concentrated solution of high-purity lithium; progress is ongoing in this regard.

During optimisation experiments, the Inventors varied the temperature of the extraction medium between about 25 and about 200° C. The rate at less than about 100° C. is low; there was observed a large increase in rate in going to 150° C., but no further increase was observed upon raising the temperature to 200° C. Significantly, the purity of the extract is reduced significantly in going from 150 to 200° C.

The extraction of lithium from the milled β-spodumene sample was more than 85% complete after 5 h. Other metal ions detected in the extract were Na, K, Mg, Ca, Mn, Fe, Al, and Si. Overall, lithium constituted >85% of the metals extracted from the spodumene sample, on a molar basis. The dominant impurity was silicon (~12%), followed by sodium (~1.5%) and potassium (~1%, on a molar basis).

The reaction was also detectable in a batch reactor sparged with $CO_2$ at room temperature and atmospheric pressure.

The general method employed above amply demonstrates that the use of carbonic acid as an extraction medium for lithium carbonate from spodumene ore is surprisingly efficacious. As rationalised above, this finding is completely counterintuitive given the prevailing state of the art in which strong acids and carbonate leaching are the currently-preferred industrial methods for the extraction of lithium from pegmatitic ores such as spodumene.

Examples of the Inventive Method

| Example No. | Li-containing ore* | Extraction medium | Milled size (μm, sieved, mean) | Water flow rate (g/min) | Extraction temp (° C.) | Pressure (bar) | Specific molar amount $CO_2$ (mol/kg) | Time (h) | Yield (%) |
|---|---|---|---|---|---|---|---|---|---|
| 1 | Spodumene | Water | 20 | 1 | 150 | 100 | 3.7 | 8 | 85 |
| 2 | Spodumene | Water/acetic acid | 40 | 2 | 180 | 120 | 3.0 | 6 | 80 |
| 3 | Spodumene | Water/sulfur acid | 50 | 1 | 120 | 140 | 4.0 | 5 | 90 |
| 4 | Spodumene | Water/LiOH | 80 | 3 | 90 | 200 | 2.5 | 10 | 85 |
| 5 | Spodumene | Water | 100 | 5 | 190 | 80 | 4.5 | 3 | 90 |

*Inherently comprising impurities, as defined above

General Method Employed

The use of carbonic acid in the extraction of lithium from β-spodumene was demonstrated on a laboratory scale. A 1 g sample of milled β-spodumene (sieved to lie in the size range ~20 to ~75 μm) was held in a tubular reactor. A water flow of 1 g/min was passed through the reactor at a temperature of 150° C. and a pressure of 100 bar. The aqueous reactor effluent was sampled at regular intervals and analysed for the presence of lithium and other metals extracted from the spodumene charge.

With only water flowing through the reactor, a gradual release of lithium was observed, but this was accompanied by aluminium and silicon in proportions close to their respective stoichiometric proportions in spodumene. However, when $CO_2$ in the amount of 3.7 mol/kg water was also fed to the reactor, a relatively greater proportion of lithium surprisingly appeared in the product samples; the concentration of lithium in the product samples increased by a factor of 5 or more, while the concentrations of aluminium and silicon were markedly reduced by comparison.

In order to demonstrate the scope and reproducibility of the present invention, the following five experiments were conducted, using the general methodology prescribed above, whilst varying some of the parameters described above. The results, as shown in the "yield" column (% yield on an extracted lithium to crude lithium basis) duly demonstrate the utility of the presently-claimed method.

Surprisingly, it has been found that the base (catalysed) reaction is relatively fast and leads to approximately congruent extraction of lithium (i.e., Li is accompanied by Al and Si, more or less in their molar proportions, 1 and 2, respectively, in the spodumene).

Experimental Results for Carbonic Acid Extraction

Provided below are results obtained to characterise the rates of extraction of Li and the other elements over the range of temperatures from 100-200° C. and pressures from 20-100 bar. In all the runs shown, the mass fraction of $CO_2$ in the water-$CO_2$ mixture was 15%; the specific mass flow rate of the mixture was of sample was in the range 0.5 to 5 kg min$^{-1}$ per kg.

The rate of extraction as a function of temperature was analysed at parameters of: pressure (100 bar); reaction time (4 hours); and specific mass rate (0.5 min$^{-1}$). Table 1, shown below, shows the extent of Li extraction ($X_{Li}$) by carbonic acid over a 4 hour period.

TABLE 1

Extent of Li extraction ($X_{Li}$) by carbonic acid over a 4 hour period

| T (° C.) | $X_{Li}$ (—) |
|---|---|
| 100 | 12.4 |
| 125 | 42.8 |
| 150 | 80.0 |
| 200 | 88.0 |

Figure 3:
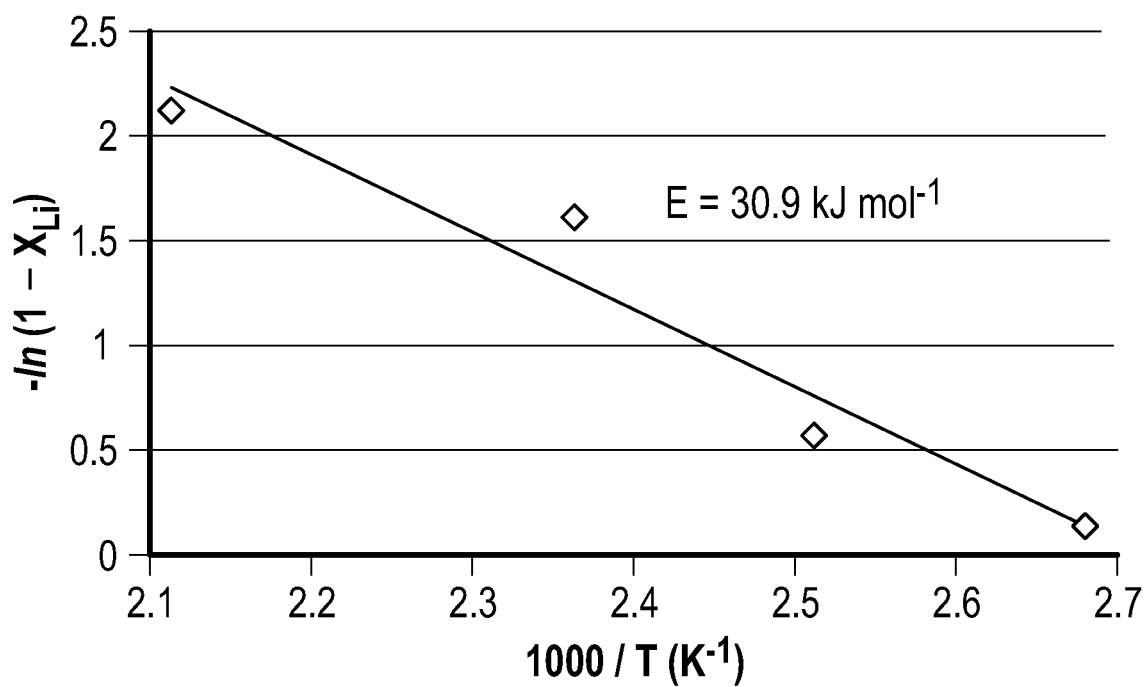
FIG. 3 is a plot showing data for effect of temperature showing apparent first order kinetics and activation energy.
Figure 4:
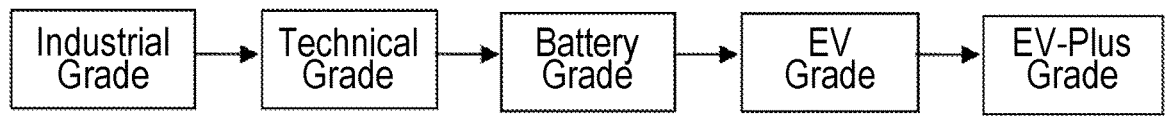
FIG. 4 shows a grading of lithium carbonate for the battery industry.
Figure 5:
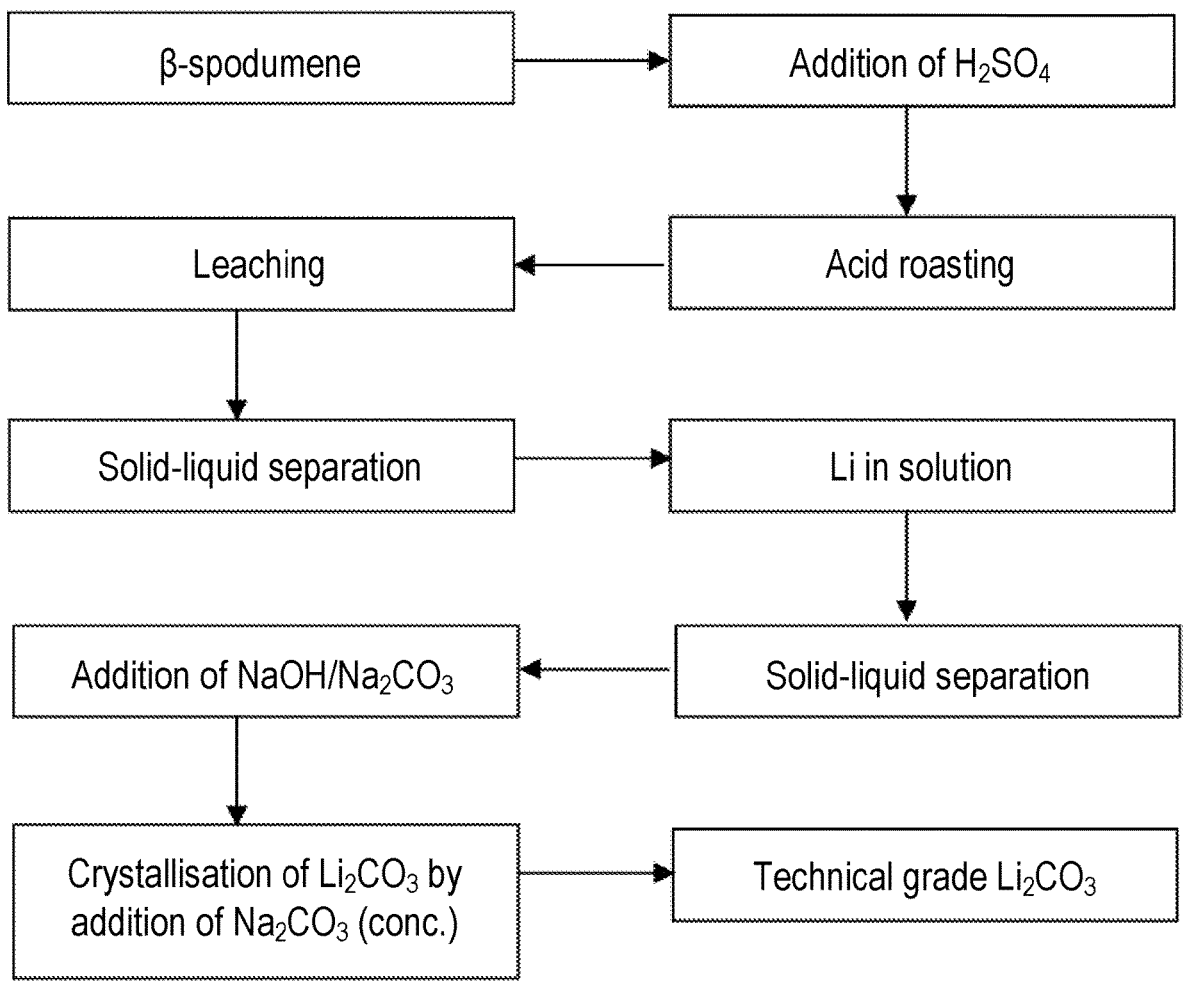
FIG. 5 shows a general process for sulfuric acid leaching of lithium from β-spodumene.
Figure 6:
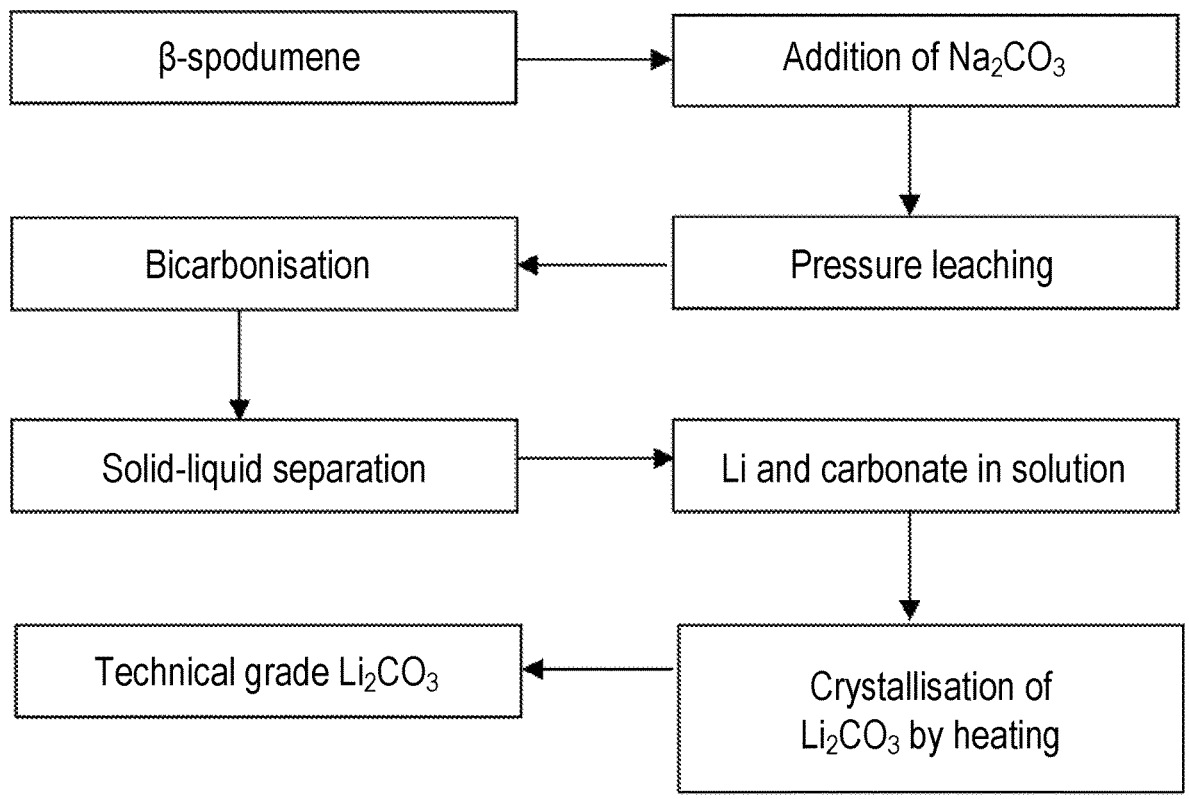
FIG. 6 shows a general process for the pressure-leaching of lithium carbonate from β-spodumene.

The extraction is clearly activated, approaching completion only at the higher temperatures. As shown in FIG. 3, the degree of extraction follows first order kinetics with an apparent activation energy ~30 kJ mol$^{-1}$.

Table 2, below, summarises results for the effects of specific mass rate and pressure on the extent of extraction and its composition. In each of these runs (2, 3, and 4), leaching was carried out for 2 hours at 150° C.

Reducing the pressure from 100 (Run 2) to 20 bar (Run 3) led to a 50% reduction in the extent of lithium extraction, which is ascribed to the lower proton concentrations arising when the CO$_2$ pressure over the solution is reduced. The Li fraction of the total extract is slightly reduced while that of matrix Si is increased correspondingly; the relative amounts of Li, Na and K in the extract are approximately constant.

TABLE 2

Elemental composition of extract obtained after 2 hours at 150° C.

| | | Run number | | |
|---|---|---|---|---|
| | | 2 | 3 | 4 |
| Specific mass rate | (min$^{-1}$) | 0.5 | 0.5 | 5 |
| Pressure | (bar) | 100 | 20 | 100 |
| $X_{Li}$ (%) | (%) | 40.4 | 22.7 | 86.7 |
| Extracted element | Li | 59.44 | 44.66 | 59.21 |
| wt % | Si | 37.89 | 49.52 | 33.01 |
| | Al | 0.03 | 0.41 | 0.70 |
| | K | 1.02 | 3.12 | 3.80 |
| | Na | 1.62 | 2.28 | 3.27 |

Comparison of Runs 2 and 4 in Table 2 shows the effect of specific mass rate. At higher values of this parameter, the mineral sample is exposed to a greater volume of acid solution overall and the concentrations of the extracted minerals are reduced. As discussed above, a lower lithium concentration is accompanied by a higher proton concentration, with the result that the rate of extraction of lithium from the rock is higher. The more dilute conditions appear also to enhance the relative fractions of Na and K in the leachate. Clearly, there is a trade-off between the leaching time required and the degree to which the leachate must be concentrated and purified in order to be able to achieve concentrations high enough to precipitate highly purified lithium carbonate.

Essentially complete extraction of lithium from β-spodumene can be achieved using carbonic acid. The treatment also extracts some silica and alumina from the rock, as well as sodium and potassium. The extraction process is faster at higher temperatures and pressures, and when the products are more dilute (<100 ppm wt/wt lithium).

Economic and Environmental Implications

The above examples demonstrate that, contrary to the accepted wisdom of using strong acid or base to extract lithium from one or more lithium-containing ores such as β-spodumene, lithium can also be extracted under the relatively mild conditions of a CO$_2$/H$_2$O extraction medium. Such a process engenders many of the advantages of traditional sulfate or Quebec lithium extraction, without the negative consequences in respect of lithium selectivity, cost, environmental damage and without the need for one or more subsequent purification/extraction steps.

The inventive method of extracting lithium from lithium-containing ores such as β-spodumene engenders many advantages over the methods prescribed in the prior art. In using carbonic acid as the extraction medium at only moderate temperature, pressure—and over a relatively short reaction period, the inventive method is genuinely counter-intuitive. Moreover, as compared with the representative prior art methods (e.g., concentrated H$_2$SO$_4$; 19 equivalents of HF, etc.), the present invention provides for an environmentally-friendly approach to what has traditionally been a somewhat damaging and wasteful pursuit.

INDUSTRIAL APPLICABILITY

With ever-increasing global demand for lithium (e.g., in batteries) and, in particular, Australia's vast natural deposits of lithium-containing ores such as spodumene (around one-third of the global market), the economic implications of successfully developing and commercialising the inventive technology may be significant.

Although the invention has been described with reference to specific examples it will be appreciated by those skilled in the art that the invention may be embodied in many other forms.

The claims defining the invention are as follows:

1. A method for the extraction of lithium from one or more lithium-containing ores, said method comprising the steps of:
   a) milling said one or more lithium-containing ores to a predetermined average particle size to provide a milled crude ore;
   b) calcining said milled crude ore at a predetermined calcining temperature to obtain a calcined milled crude ore;
   c) providing an aqueous medium comprising a suspension of the calcined milled crude ore, at a predetermined solids concentration;
   d) subjecting said calcined milled crude ore to an acidic extraction medium defined by a predetermined partial pressure of CO$_2$, a predetermined extraction temperature, over a predetermined time; and
   e) obtaining technical grade lithium carbonate and/or lithium bicarbonate in solution from the extraction medium.

2. The method according to claim 1, wherein the one or more lithium-containing ores comprise β-spodumene, or wherein the one or more lithium-containing ores consist essentially of β-spodumene.

3. The method according to claim 1, wherein the predetermined calcining temperature is greater than about 900° C., thereby to convert α-spodumene to β-spodumene.

4. The method according to claim 1, wherein said predetermined partial pressure of CO$_2$ is between about 0.1 and about 300 bar; and wherein said predetermined extraction temperature is between about 20° C. and about 350° C.

5. The method according to claim 1, wherein said predetermined solids concentration is between about 0.1 and about 60% w/w.

6. The method according to claim 1, wherein said predetermined average particle size is between about 0.1 μm and about 1000 μm.

7. The method according to claim 1, wherein said predetermined time is between about 1 and about 1000 minutes.

8. The method according to claim 1, giving a yield on an extracted lithium to crude lithium basis of between about 1% and about 99%.

9. The method according to claim 1, wherein one or more impurities are extracted from said one or more lithium-containing ores; wherein said one or more impurities comprise Na, K, Mg, Ca, Mn, Fe, Al, and Si; and wherein each of said one or more impurities is present at a concentration between about 0.5% and about 40% of the lithium concentration on a molar basis.

10. The method according to claim 1, further comprising a concentration step f), wherein the technical grade lithium carbonate obtained in solution from step e) is concentrated.

11. The method according to claim 10, wherein said concentration step comprises: a concentrator, evaporation, reverse osmosis, electrodialysis, liquid-liquid extraction, selective adsorption solid state extraction or membrane separation.

12. The method according to claim 10, wherein following said concentration step g), the lithium carbonate precipitates out of solution; and wherein the method further comprises a filtration step g), thereby to separate the precipitated lithium carbonate.

13. The method according to claim 1, wherein the aqueous medium comprises water, one or more mineral acids, one or more organic acids, one or more alkaline salts, one or more ionic liquids, and combinations thereof.

14. The method according to claim 13, wherein the one of more mineral acids are supplemented with a predetermined partial pressure of $CO_2$ between about 0.1 and about 300 bar.

* * * * *